United States Patent [19]

Rossi

[11] Patent Number: 5,664,013
[45] Date of Patent: Sep. 2, 1997

[54] EMBEDDED NOTEPAD SYSTEM FOR A CELLULAR TELEPHONE

[75] Inventor: Markku J. Rossi, Houston, Tex.

[73] Assignee: Compaq Computer Corporation, Houston, Tex.

[21] Appl. No.: 486,866

[22] Filed: Jun. 7, 1995

[51] Int. Cl.[6] .................................................. H04M 1/00
[52] U.S. Cl. .................... 379/428; 379/433; 379/454; 379/447
[58] Field of Search ................ 379/428, 450, 379/456, 447, 433, 354, 110, 130, 131; 455/89, 90, 128; 400/718, 718.1; 395/148; D14/149

[56] References Cited

U.S. PATENT DOCUMENTS

| | | | |
|---|---|---|---|
| Re. 34,476 | 12/1993 | Norwood | 382/13 |
| D. 330,024 | 10/1992 | Peersmann | D14/149 |
| 3,368,296 | 2/1968 | Edwards | 379/450 |
| 4,291,475 | 9/1981 | Schoemer | 379/450 |
| 4,304,968 | 12/1981 | Klausner et al. | 379/354 |
| 4,807,154 | 2/1989 | Scully et al. | 364/518 |
| 4,837,590 | 6/1989 | Sprague | 346/145 |
| 4,849,815 | 7/1989 | Streck | 379/100 |
| 5,106,141 | 4/1992 | Mostashari | 296/24.1 |
| 5,109,539 | 4/1992 | Inubushi et al. | 455/89 |
| 5,137,321 | 8/1992 | Landry et al. | 296/24.1 |
| 5,175,758 | 12/1992 | Levanto et al. | 379/57 |
| 5,197,774 | 3/1993 | Diaz | 296/24.1 |
| 5,200,991 | 4/1993 | Motoyanagi | 379/110 |
| 5,212,721 | 5/1993 | Deluca et al. | 379/57 |
| 5,226,540 | 7/1993 | Bradbury | 206/576 |
| 5,237,651 | 8/1993 | Randall | 395/148 |
| 5,242,056 | 9/1993 | Zia et al. | 206/576 |
| 5,243,149 | 9/1993 | Comerford et al. | 178/18 |
| 5,247,700 | 9/1993 | Wohl et al. | 455/33.1 |
| 5,253,292 | 10/1993 | Fluder et al. | 379/426 |
| 5,337,358 | 8/1994 | Axelrod et al. | 380/23 |
| 5,348,347 | 9/1994 | Shink | 379/446 |
| 5,452,876 | 9/1995 | Hatcher | 400/718 |

*Primary Examiner*—Jack K. Chiang
*Attorney, Agent, or Firm*—Jenkins & Gilchrist

[57] ABSTRACT

A support bracket for an electronic daytimer (e.g., a PDA or a PIM), a cellular telephone, and pager combination includes a housing with at least two indentions, one of which is sized to receive an electronic daytimer and the other of which is sized to receive a cellular telephone; power supply lines carried by the housing so as to connect with, and thereby provide power, to a received electronic daytimer and/or received cellular telephone; and a printer for an electronic daytimer secured to the housing and combined with a cable connecting it to a received electronic daytimer.

5 Claims, 2 Drawing Sheets

EMBEDDED NOTEPAD SYSTEM FOR A CELLULAR TELEPHONE

BACKGROUND OF THE INVENTION

1. Field of the Invention

The present invention relates generally to the field of electronic organizers and communications devices. More particularly, the present invention relates to combined electronic organizers and communication devices especially well suited to be disposed in automobiles.

2. Description of the Related Art

Outside salespersons, who account for a large percentage of total sales in many product lines, have heretofore been a generally "forgotten" portion of the business community when it comes to electronic assistance. These salesmen have two fairly distinct needs. One need is for a means to collect, manipulate, and retrieve information. The second need is for a means to communicate with, for example, the home office and customers and clients.

The first need can be, and has been, addressed by "daytimers," that is, paper address books and calendars. Such books and calendars are high maintenance items; entries can be smudged or written over to illegibility; pages can be lost or damaged by rain or other liquids; and, very significantly, such books and calendars are hard to back up—if one is lost, it is difficult, at the every least, to replace it.

Electronic, as opposed to paper, capture of data has advantages in that back up copies of the data can be made and kept in various different places, reducing the likelihood of total loss. Electronically captured data can be manipulated very easily, and presented in multiple ways if desired. This capability can ensure that current and historical data is not confused, rendered illegible, or otherwise made useless.

In the electronic data processing area, notebook computers have evolved so that they can keep address and appointment information. However, such computers still suffer lack of easy portability, and they have limited battery life. Likewise, personal digital assistants ("PDA's") have heretofore evolved so that they can readily keep information needed by outside salespersons and other such mobile professionals. PDA's, or personal information managers ("PIM's"), are hand held devices generally including a processor and a memory, and a primary user interface in the form of a pressure sensitive screen. PDA's or PIM's (and those two terms are used interchangeably throughout this document) have advantages including small size and weight relative to notebook computers, and the fact that they deal with information electronically. However, many people still consider PDA's to be too large and heavy to conveniently carry around.

Regarding communication capability, both notebook computers and PDA's have heretofore been provided with modems and interfaces for telephone line connection and communication, provided with cellular telephone interfaces for wireless communication, and provided with infrared link means for optical communication. These capabilities, although desirable and good, have not made notebook computers or PDA's any easier to carry. Paper address books and calendars communicate only by being read.

Mobile professionals also have communication needs involving voice as opposed to data communication. To address these needs, cellular telephones and pagers have become popular options. The cellular telephone is used mainly for outgoing calls from a car. The pager is used for receiving call requests.

In general, at the present time, all of the foregoing options and accompanying pros and cons have led mobile professionals to carry daytimers, cellular telephones and pagers. Even though it would be highly desirable to receive, manipulate, store and communicate "daytimer" data electronically, there has not heretofore been developed a product that has been perceived as being so convenient and easy to use that it has replaced the daytimer/cellular telephone/page triumvirate. It is a shortcoming and deficiency of the prior art that there has not yet been developed such a product.

SUMMARY OF THE INVENTION

The present invention overcomes the shortcoming and deficiency mentioned above by providing a support bracket including a housing, power supply lines, and a printer. In embodiments of the present invention, the housing has at least two indentions, one of which is sized to snugly receive a personal digital assistant, the other of which is sized to snugly receive a cellular telephone. Still further, in embodiments of the present invention, the power supply lines are carried by the housing so as to connect with, and thereby provide power to, a personal digital assistant received in its indentation and so as to connect with, and thereby provide power to, a cellular telephone received in its indentation. Still yet further, in embodiments of the present invention, the printer is designed so as to be able to interface with a personal digital assistant and is secured to the housing and combined with a cable connecting it to a personal digital assistant received in its housing.

Accordingly, an object of the present invention is to provide a combined car bracket, electronic daytimer, pager, and cellular telephone, a purpose of which is to ensure all information and capabilities needed by a mobile professional can be neatly carried in a car, and to further ensure that all essential information needed by that mobile professional for a trip away from his or her car can be easily extracted from the car and carried.

BRIEF DESCRIPTION OF THE DRAWINGS

Other objects, advantages, and novel features of the present invention will become apparent from the following detailed description of the invention when considered in conjunction with the accompanying drawings in which.

DESCRIPTION OF THE PRESENTLY PREFERRED EXEMPLARY EMBODIMENTS

Figure 1:
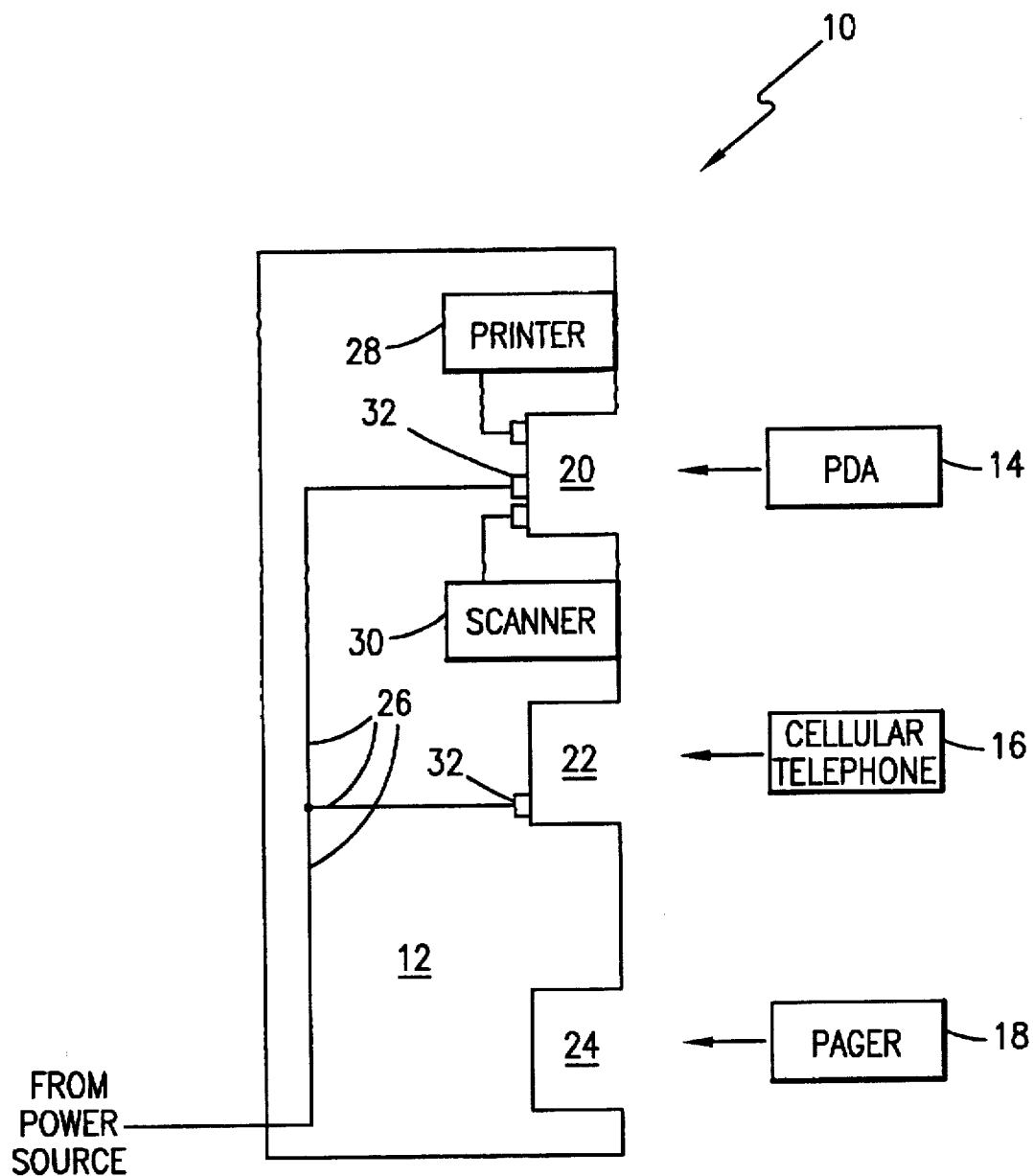
FIG. 1 is a block diagram of an embodiment of the present invention.

Referring now to the drawings wherein like or similar elements are depicted with identical reference numerals throughout the several views and, more particularly, to FIG. 1, there is shown a block diagram of a combined electronic daytimer, cellular telephone, and pager system (generally designated by reference numeral 10) according to the teachings of the present invention. The system 10 includes a number of combined elements, including a support system 12, a PDA 14, a cellular telephone 16, and a pager 18. Each of these elements is discussed below.

The support system 12 is an element designed to be easily and neatly disposed in an automobile, in a position where the elements it supports can easily be reached by the automobile operator. The support system 12 could be a plastic or metal bracket, for example, designed to be mounted in the front seat portion of an automobile between the driver and passenger seats.

The support system 12 includes portions 20, 22, 24 configured so as to snugly receive the PDA 14, the cellular telephone 16, and the pager 18, respectively. These portions 20, 22, 24 could be indentations in the plastic or metal support system 12. It is important that these portions receive the elements 14, 16, and 18 snugly, so that there is no "rattling" during vehicle movement and so that certain connections (discussed below) are properly made. It is also important that the portions 20, 22, and 24 be configured so that the elements 14, 16, and 18 can easily be removed from the portions 20, 22, and 24 by a system 10 user if desired. The portions could have, for example, adjacent finger grooves by which a user could insert his or her finger under a snugly received element 14, 16, and 18 and then pull up to remove it.

The support system depicted in FIG. 1 may be seen to also include power lines 26, a printer 28, and a scanner 30. The purpose of power lines 26 is to provide power to any of the elements 14, 16, 18 that could profitably use it. In FIG. 1, the lines 26 may be seen to connect a power supply (e.g., a car battery, not shown) to contacts 32 and 34 in portions 20 and 22. Via these contacts 32, 34, and corresponding conventional contacts (not shown) on the PDA 14 and the cellular telephone 16, the automobile battery may be drawn upon to charge or recharge conventional power supplies in the PDA 14 and the cellular telephone 16. If a particular element, such as the pager 18, has an independent power supply (e.g., an enclosed battery that cannot be recharged when installed in the pager 18) lines 26 need not establish contact between the automobile battery and the indention (here, indention 26) in which that element may be placed (in this discussion, element 18.

As mentioned above, the support system 12 depicted in FIG. 1 also includes a printer 28 and a scanner 30. These two elements 28, 30 are designed to work in concert with the PDA 14. The scanner can convert information in written form (i.e., a note or small completed form) into electronic form for storage in the PDA 14. The converted electronic conformation can be stored in the PDA 14 in graphic form or, provided the PDA includes a character recognition capability, in a recognized text form. The purpose of printer 28 is to provide a written record of selected information within the PDA, preferrably on small slips of paper (discussed below).

The pager 18 depicted in FIG. 1 is a conventional one. The purpose of the pager 18 is to alert the mobile professional of the fact that someone desires to communicate with him or her. The pager 18 also provides certain information (e.g., a telephone number) regarding the person seeking to establish communications.

Figures 2, 3:
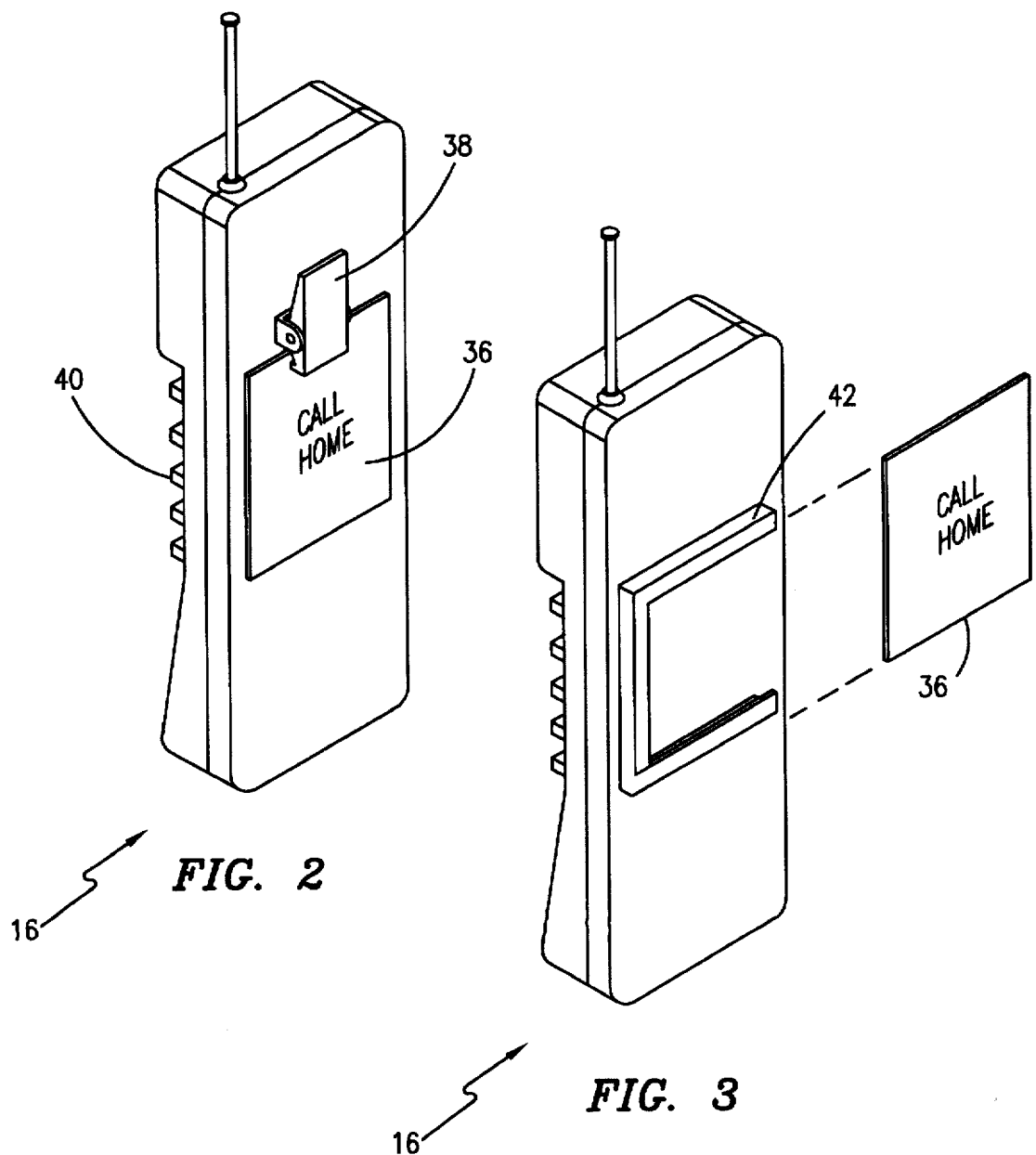
FIG. 2 is a perspective view of a portion of an embodiment of the present invention.
FIG. 3 is a perspective view of an alternative portion of an embodiment of the present invention.

The cellular telephone 16 depicted in FIG. 1 is also generally conventional. However, referring to FIGS. 2 and 3 it may be seen that the cellular telephone 16 is novel in at least one respect: it includes a means for holding the small slips of paper mentioned above. In FIGS. 2 and 3 the small slips of paper are designated with reference numeral 36. In FIG. 2, the means for holding the slip of paper 36 is a clip 38 mounted on the backside (i.e., the side opposite the conventional keypad 40) of the cellular telephone 16. In FIG. 3, the means for holding is shown to be a three sided frame structure 42 into which the slip of paper 36 can be slid.

Based upon the description of elements above, operation of the system 10 can now be understood. When traveling in an automobile the support system 12 keeps a PDA 14, a cellular telephone 16, and pager charged (as appropriate) and readily assessible. When the mobile professional leaves the automobile, he or she need only take the cellular telephone 16 and pager 18 with him or her. The mobile professional has this freedom because any information needed from the PDA 14 can be printed by the PDA 14 and printer 28 onto a small piece of paper 36. Such information could include a to-do list, names and telephone numbers of persons appearing in near-by dates, the twenty most commonly used names and numbers, or the like. One or more slips of paper could then be attached to the cellular telephone 16 for use by the mobile professional while away from his or her automobile.

If the user writes notes on a piece of paper, he or she can enter that information into the PDA upon returning to the automobile. This information can either be entered manually into the PDA (e.g., via the PDA input screen) or into the PDA via the scanner 30.

Based upon the foregoing, it now be understood and appreciated that the present invention provides a well integrated package for keeping mobile professionals informed and in touch. Because, except for the inclusions of a means for holding paper on the cellular telephone 16, the present invention employs generally conventional major components, existing components can readily be assimilated into embodiments of it.

Obviously, numerous modifications and variations are possible in view of the teachings above. For example, the support system 12 could include portions defining a slot to hold small slips of paper 36. As another example, semi-sticky note paper (e.g., POST-IT™ brand noted) could be used as paper 36, which could alleviate a need to include a means for holding (other than just a surface) on the cellular telephone 16. In embodiments of the present invention, a scanner need not be included. Other such modifications and variations, too numerous to discuss in detail or even mention, can also be made based upon the teachings above. Accordingly, within the scope of the appended claims, the present invention may be practiced otherwise than as specifically described herein.

What is claimed is:

1. An embedded notepad system for a cellular telephone system comprising:
    a cellular telephone, said cellular telephone having a means for holding a piece of paper;
    a printer for printing information on said piece of paper, said information comprises information extracted from a personal digital assistant, wherein said printer is connected directly to said personal digital assistant; and
    support means for detachably supporting said cellular telephone and said personal digital assistant.

2. The system as recited in claim 1, wherein said means for holding comprises a clip mounted on said cellular telephone.

3. The system as recited in claim 1, wherein said means for holding comprises a three sided frame structure integral with said cellular telephone.

4. The system as recited in claim 1, wherein said support means supports said printer.

5. The system as recited in claim 1, further comprising means for charging said personal digital assistant and said cellular telephone when supported by a unitary support.

* * * * *